UNITED STATES PATENT OFFICE.

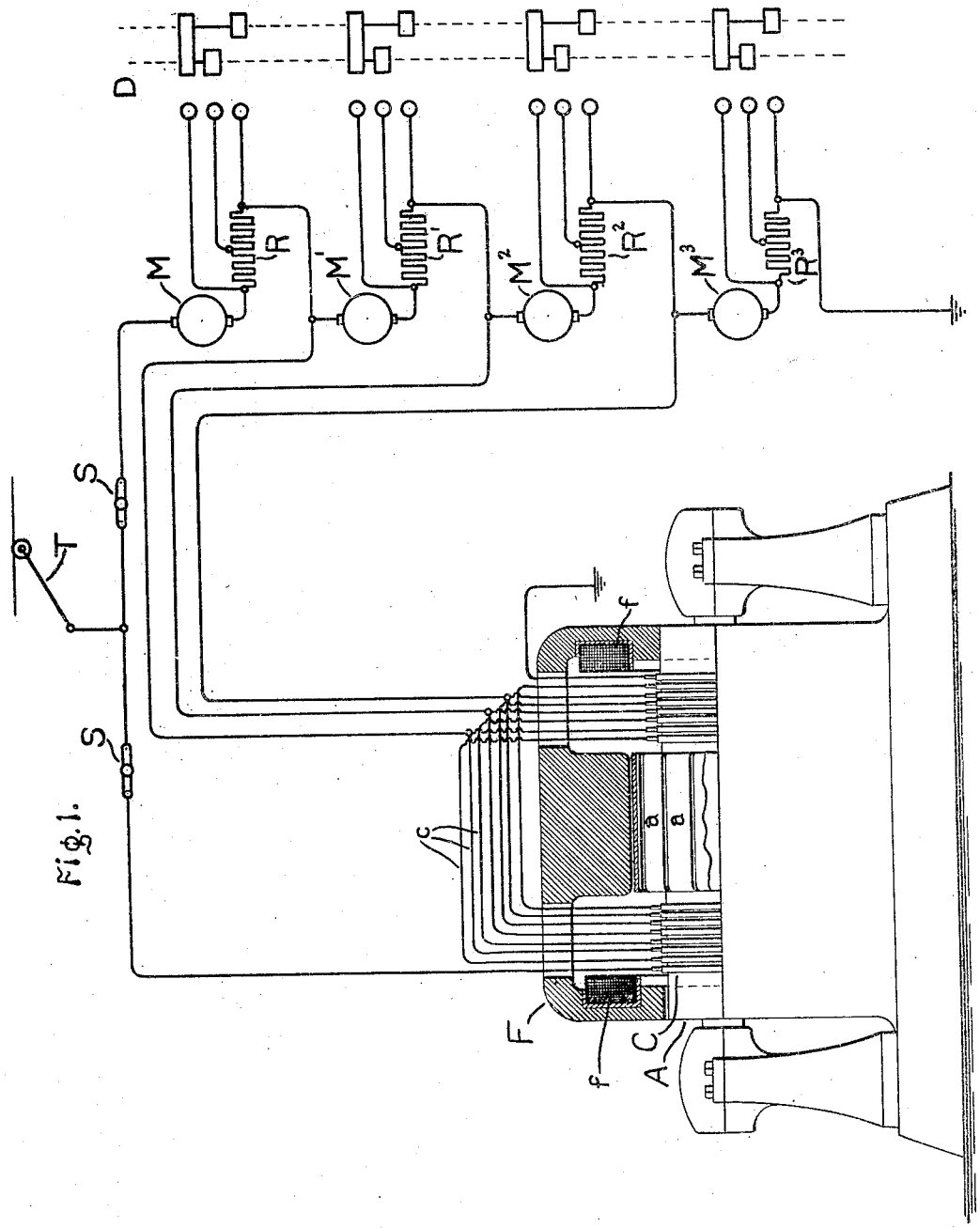

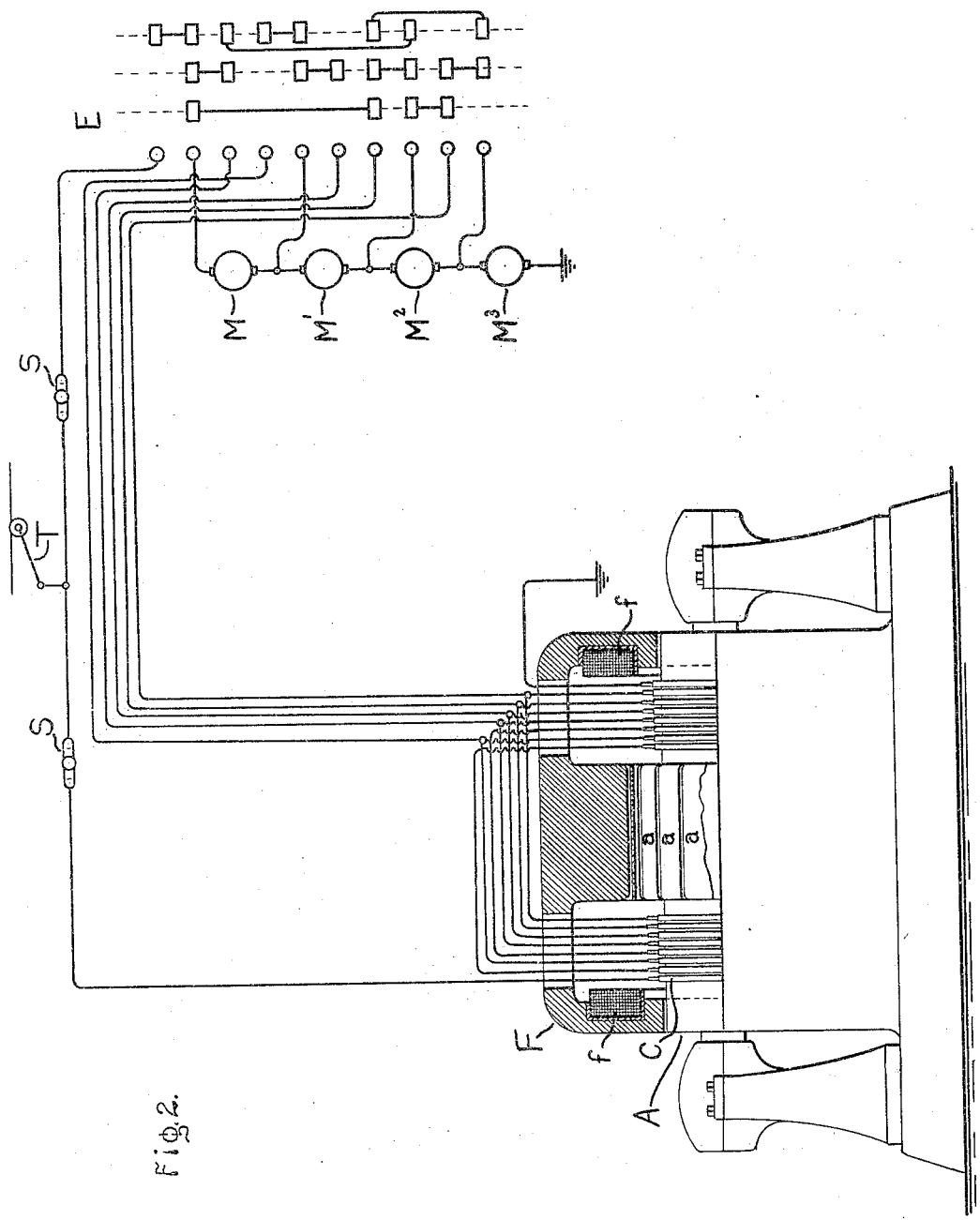

JAKOB E. NOEGGERATH, OF SCHENECTADY, NEW YORK, ASSIGNOR TO GENERAL ELECTRIC COMPANY, A CORPORATION OF NEW YORK.

MOTOR CONTROL.

No. 827,320.   Specification of Letters Patent.   Patented July 31, 1906.

Application filed November 17, 1905. Serial No. 287,801.

*To all whom it may concern:*

Be it known that I, JAKOB E. NOEGGERATH, a citizen of the United States, residing at Schenectady, county of Schenectady, State of New York, have invented certain new and useful Improvements in Motor Control, of which the following is a specification.

My invention relates to the control of direct-current motors, and is particularly applicable to heavy electric locomotives; and its object is to provide a novel arrangement whereby a plurality of motors may be permanently connected in series, so as to operate with a source of voltage higher than would be permissible for the terminal voltage of a single machine.

It is well understood in the art that commutation difficulties prevent employing a voltage at the terminals of a motor which is above certain limits. In railroad-work this limit is usually placed at about six hundred volts. For large roads and long-distance transmission six hundred volts is much too low for economy in conductors, and it has been customary heretofore on long roads either to employ an alternating-current-transmission system with substations to transform the alternating current to direct or to employ alternating-current motors.

It is obvious that if a number of direct-current motors are connected permanently in series the voltage at the terminals of each motor is only a fraction of the total voltage of the circuit, but in electric vehicles having motors connected to different driving-wheels a simple series connection of the motors is not satisfactory in operation, since if one driving-wheel slips the motor which is connected thereto speeds up and takes practically the entire voltage of the circuit. Consequently when it has been desired heretofore to employ a higher-transmission voltage than may conveniently be supplied to the motor-terminals it has been customary to employ alternating-current transmission either with rotary-converter substations or with alternating-current motors on the car.

Rotary-converter substations are expensive both in first cost and maintenance, and direct-current motors present certain advantages over alternating-current motors.

By my invention I am enabled to employ direct current both for the transmission system and for the motors at a much higher voltage than is impressed upon the motor-terminals. Thus I avoid the necessity of substations and obtain all the advantages of direct-current motors. I accomplish this result by permanently connecting a plurality of motors in series and connecting in parallel with them a unipolar dynamo-electric machine with connections from intermediate points on the winding of the unipolar machine to points of connection between the motors. The unipolar machine thus acts as a voltage compensator or balancer between the several motors and prevents one motor, the driving-wheel of which may be slipping, from taking more than its proper share of voltage. Since the unipolar machine has no commutator, commutation difficulties do not arise, and a machine of this type may be employed on a comparatively high line voltage. Furthermore, since a unipolar machine has of necessity its several rotating conductors connected to each other by stationary conductors a large number of stationary points in the winding of the machine are offered for forming the desired connections to the motors.

My invention will best be understood by reference to the accompanying drawings, in which—

Figure 1 shows a system of motor control arranged in accordance with my invention, and Fig. 2 shows a modified arrangement of the same.

In Fig. 1, T represents the trolley or source of current. M to M³ represent four motors, which are permanently connected in series between the trolley T and the coils or ground. Each motor is provided with a resistance R to R³ in series with it, by means of which the terminal voltage at the motor may be varied for starting purposes and for speed control. Connected in shunt to all the motors between the trolley and ground is the armature-winding of a unipolar dynamo-electric machine. F represents the field-magnet of this machine, which is provided with exciting-coils f. A represents the rotating armature carrying the armature-conductors a, each of which is connected at opposite ends to collector-rings C. These collector-rings are provided with brushes and stationary cross connections c, by means of which the several armature-conductors are placed in series. The unipolar machine has no commutator, and consequently it may be connected to a comparatively high source of voltage. With four motors, as shown in the drawings, a line voltage of twenty-four hundred volts might be employed without exceeding the usual limit of six hundred volts at the terminals of each motor. I have indicated only eight collector-rings at each end of the armature and eight armature-conductors. It will be understood, however, that in practice with such a line voltage as twenty-four hundred the number of armature-conductors and collector-rings would be increased.

In Fig. 1 connections are established between intermediate points on the armature-winding of the unipolar machine and points of connection between the several motors. Each motor and its resistance is shown connected in parallel to two armature-conductors of the unipolar machine. Since the induced voltage in each armature-conductor is the same as that in every other conductor, the machine acts as a voltage equalizer or compensator for the motors, maintaining the same voltage across the terminals of all the motors. A controlling-switch D is shown for cutting out the resistance in series with the motors, so as to vary the voltage at the motor-terminals. At starting, the switch D will be in the position shown, and when the switches S S are closed the four motors are connected in series to the source with all the resistance in circuit and the equalizing unipolar machine connected in shunt. When switch D is moved into the position indicated by the first dotted line, half of each resistance is cut out of circuit, and in the other position of switch D all of the resistances are cut out of circuit. Thus by varying the resistances the voltage at the terminals of each motor may be varied to control the motor speed and current without disturbing the series connection of the motors, and whether the resistances are in circuit or not the unipolar machine acts to maintain at all times a balance between the terminal voltages of the several motors.

With the arrangement shown in Fig. 1 it is evident that since the unipolar machine acts simply as a voltage balancer or compensator for the motors its capacity may be much less than the aggregate capacity of the motors. In practice a unipolar machine having a capacity of ten or fifteen per cent. of the total output of the motors would ordinarily be sufficient, provided four or more motors are employed. If, however, it is desired to do away with the resistances for controlling the motor speeds and current, the unipolar machine itself may be employed for varying the terminal voltages of the motor. In this case, however, the unipolar machine must obviously be of greater capacity than when it is employed simply as a voltage-balancer.

In Fig. 2 I have shown an arrangement of connections and controlling-switch by means of which the unipolar machine is employed to vary the impressed motor voltage. With the switch E in the position indicated by the first dotted line it will be seen that the motors M and M' are connected in parallel to one conductor of the unipolar machine and the motors $M^2$ and $M^3$ across a second conductor. Thus the impressed voltage between the upper terminal of motor M and the lower terminal of motor $M^3$ is one-quarter the voltage of the source. In the second position of switch E each motor is connected across one conductor of the unipolar machine, and the impressed voltage on the group of motors is one-half that of the source. In the third position of switch E each motor is connected across two conductors of the unipolar machine and the full voltage of the source is impressed on the group of motors. The third position of switch E establishes the same connections as the second position of switch D in Fig. 1, and with this connection the unipolar machine acts simply as a voltage compensator or equalizer.

Although, as has been mentioned heretofore, I have shown only eight conductors on the unipolar machine and have consequently spoken of connecting the motors across one or two conductors, it will be understood that in practice with a high line voltage a greater number of conductors would be employed.

It will further be understood that while I have shown one construction of unipolar machine which I believe to be well adapted to the purposes of my invention the particular form of the machine is not essential, but may be modified, as desired. Furthermore, the number of motors and the motor-circuits may be varied. Accordingly, I do not desire to limit myself to the particular construction and arrangement of parts here shown, but aim in the appended claims to cover all modifications which are within the scope of my invention.

What I claim as new, and desire to secure by Letters Patent of the United States, is—

1. In combination, a plurality of motors permanently connected in series, a unipolar dynamo-electric machine connected in shunt to said motors, and connections from intermediate points on the winding of said unipolar machine to points of connection between said motors.

2. In combination, a plurality of motors permanently connected in series, a unipolar dynamo-electric machine connected in shunt to said motors, connections from intermediate points on the winding of said unipolar machine to points of connection between said motors, and means for varying the voltage impressed on the terminals of the several motors.

3. In combination, a plurality of motors permanently connected in series, a unipolar dynamo-electric machine connected in shunt to said motors, connections from intermediate points on the winding of said unipolar machine to points of connection between said motors, and means for shifting said connections to different points on the winding of said unipolar machine.

4. In combination, a plurality of motors permanently connected in series, a unipolar dynamo-electric machine connected in shunt to said motors, connections from intermediate points on the winding of said unipolar machine to points of connection between said motors, and a controlling-switch in circuit with said motors.

5. In combination, a source of voltage, a plurality of translating devices connected in series to said source, a unipolar dynamo-electric machine connected to said source in shunt to said translating devices, and connections from intermediate points on the winding of said unipolar machine to points of connection between said translating devices.

6. In a railway system, a working conductor extending along the way, a plurality of motors on a vehicle connected permanently in series between said conductor and the rails, a unipolar dynamo-electric machine connected between said conductor and the rails in shunt to said motors, and connections from intermediate points on the winding of said unipolar machine to points of connection between said motors.

7. In a railway system, a working conductor extending along the way, a plurality of motors on a vehicle connected permanently in series between said conductor and the rails, a unipolar dynamo-electric machine connected between said conductor and the rails in shunt to said motors, connections from intermediate points on the winding of said unipolar machine to points of connection between said motors, and a controlling-switch in circuit with said motors.

In witness whereof I have hereunto set my hand this 13th day of November, 1905.

JAKOB E. NOEGGERATH.

Witnesses:
BENJAMIN B. HULL,
MARGARET E. WOOLLEY.